United States Patent [19]

Boyd et al.

[11] Patent Number: 5,660,675
[45] Date of Patent: Aug. 26, 1997

[54] METHOD AND APPARATUS FOR SPLICING HEAT TRANSFER PRINTING PAPER

[75] Inventors: William Boyd, Harrisonburg; Malcolm E. Clare, Mt. Crawford; George Stafford, Toms Brook; Tom Garth, Dayton, all of Va.; Clement Ramdin, Concord, N.C.

[73] Assignee: Transprint USA, Harrisonburg, Va.

[21] Appl. No.: 545,027

[22] Filed: Oct. 19, 1995

[51] Int. Cl.⁶ .......................... B32B 31/00; B65H 26/00
[52] U.S. Cl. .......................... 156/361; 156/356; 156/363; 156/378; 156/379; 156/495; 156/544; 156/546; 226/16; 226/20; 226/30; 242/534.1
[58] Field of Search .......................... 156/351, 356, 156/361, 362, 363, 378, 379, 494, 495, 544, 546, 554; 226/15, 16, 18, 19, 20, 27, 28, 29, 30; 242/530.1, 530.3, 532.3, 534.1

[56] References Cited

U.S. PATENT DOCUMENTS

| | | | |
|---|---|---|---|
| 2,698,645 | 1/1955 | Bathon et al. | 156/546 X |
| 2,735,630 | 2/1956 | Ziebolz | 156/361 X |
| 3,122,055 | 2/1964 | Hartley | 156/361 X |
| 3,177,751 | 4/1965 | Vercauteren | 226/19 X |
| 3,583,615 | 6/1971 | Ott, Jr. | 226/20 |
| 3,767,510 | 10/1973 | Gustafson | 156/494 |
| 4,368,096 | 1/1983 | Kobayahi | 156/544 X |
| 4,888,717 | 12/1989 | Ditto et al. | 156/371 X |
| 4,960,234 | 10/1990 | Focke | 226/15 |
| 5,098,507 | 3/1992 | Mao | 156/351 |
| 5,460,672 | 10/1995 | Mallonee | 156/544 X |

Primary Examiner—David A. Simmons
Assistant Examiner—Paul M. Rivard
Attorney, Agent, or Firm—Nixon & Vanderhye P.C.

[57] ABSTRACT

The disclosed apparatus implements a method of joining two sheets of heat transfer paper into a single sheet almost twice as wide for use in heat transfer printing of extra wide cloth. The paper is withdrawn from source rolls and passed along first and second respective web paths with a very slight overlap between the papers. A glue station applies a speed controlled amount of glue to the overlap region of one paper and the edges of the paper are brought together in the desired overlapping relationship. The thus joined paper is passed through compression rollers and wound onto a resilient rewind roll. Edge sensors in each of the web paths maintain the overlap alignment of the paper paths and tension sensors in each of the paths maintain a desired level of tension. A video camera imaging system provides the operator with periodic video images of a magnified region of the overlap so that proper registration between the patterns on the respective papers can be maintained. Should the pattern loose registration, the operator can pulse a brake on one of the source rolls which has the effect of quickly moving the paper back into alignment.

13 Claims, 5 Drawing Sheets

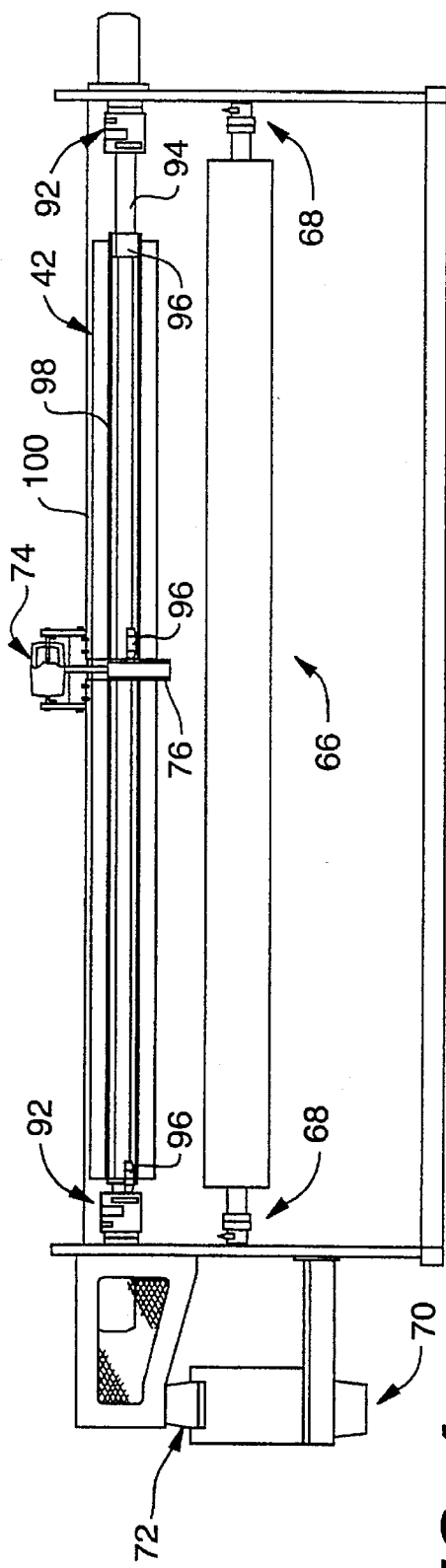
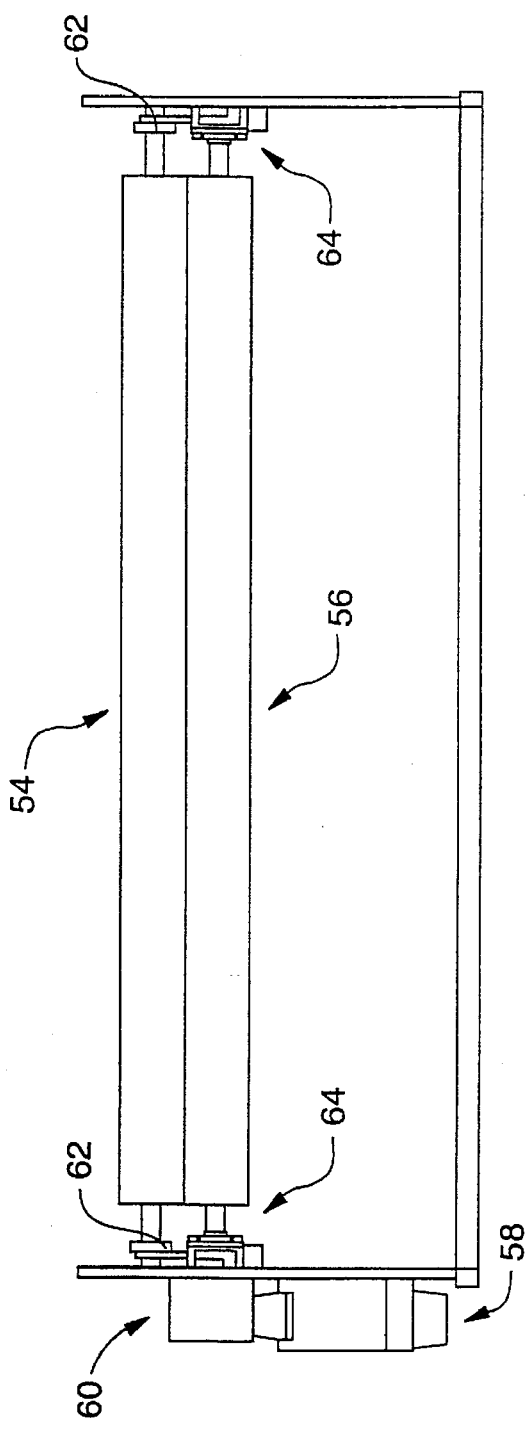
FIG. 4
FIG. 5

METHOD AND APPARATUS FOR SPLICING HEAT TRANSFER PRINTING PAPER

BACKGROUND OF THE INVENTION

1. Field of the Invention

The present invention relates generally to the creation of heat transfer printing paper used in the process of printing cloth with various multi-colored designs and specifically to a method and apparatus for creating extra wide heat transfer printing paper.

2. Discussion of Prior Art

In the cloth printing process, it is known to utilize heat transfer printing paper to transfer cloth printing ink from a specific pattern on the paper to the cloth to be printed. In order to print cloth with the pattern on the paper, the cloth and the paper are placed together for a specific period of time under a specific pressure at a specific temperature during which time ink from the printing paper is transferred to and colors the cloth with which it is contact.

Because the heat transfer ink pattern can be precisely printed on the heat transfer printing paper, the pattern will also be accurately duplicated on the cloth printed therefrom. Conventionally, printing paper up to 64 inches in width is printed with a print width of approximately 63 inches with one or more colors in a series of successive printing stations, each of which are in registration with the other stations. This registration is important in the printing of the ink on the heat transfer printing paper so that each of the desired colors in a pattern is in precise registration with other colors in order to form a desired image.

The accuracy required for the printing of high-quality heat transfer printing paper (for high quality printing of cloth) necessitates the use of the rotogravure printing process. In this process, an individual printing drum is engraved so as to provide microscopic pits in the area where ink is to be printed on the paper. During the printing of the pattern onto the paper, the surface of the engraved roller passes through an ink bath and the pits will pick up and retain a desired quantity of ink, whereas the rest of the engraved roller will not retain any ink. The engraved roller then comes into contact with the printing paper and the capillary action of the paper transfers the ink from the pit to the paper.

Because the engraving of such rollers can be done extremely accurately, heat transfer printing paper made by the rotogravure printing process has an extremely high degree of accuracy. Such accuracy is necessary especially when the paper may be printed with 3, 6, 8 or even 10 different colors of ink.

While the 63 inch cloth width is adequate for use in clothing and other types of apparel, a wider cloth is highly desirable for use in draperies, bedspreads, etc. The need for wider cloth has created a demand for wider heat transfer print paper such that designs can be reproduced on larger widths of cloth, i.e., greater than the conventional 63 inch width.

It would seem that to satisfy the need for wider fabric, one would merely use a rotogravure roller having the larger width. However, the handling of the wider width rotogravure roller is difficult and expensive (the 126" rotogravure roller would cost more than twice the conventional smaller 63 inch print width roller). Further, it would be difficult to store the engraving rollers having the larger width. There is also a lack of machinery capable of printing onto heat transfer paper utilizing the rotogravure process at the larger width.

Attempts have been made to use a rotary screen printing process for printing heat transfer ink onto wider heat transfer print paper (up to 126 inches in width) but such process does not provide acceptable pattern accuracies, especially for highly complex, multi-colored patterns possible with the rotogravure printing process.

One attempt to satisfy the need for wider printed cloth is a machine manufactured by the Lemaire company in France in which conventional width print paper is used to print a wider width of cloth. Two rolls of conventional width printed heat transfer paper are carried along two parallel paths and are placed in contact with the cloth to be printed. The parallel paths are adjacent such that the pattern image from one parallel path is, hopefully, in precise registration with the pattern image on the other parallel path with the result that the pattern is transferred to and printed on the wider than normal cloth.

As can be imagined, such a printing process is extremely slow and is very sensitive to going off registration which results in a high degree of wastage of cloth being printed. Additionally, because of the need to attempt to maintain accurate registration, the operating speed is on the order of 7 to 8 yards of cloth per minute and the cost of such a machine is quite high ($450,000 or more). Consequently, while the Lemaire machine permits the usage of rotogravure printed conventional width paper, it suffers from the problem that the company using the paper must maintain the two parallel paths of paper in precise registration during the printed process.

Clearly, if wider paper with heat transfer ink patterns printed thereon were available, the cloth printing company would not be concerned with registration and higher speeds of printing would be available, thus providing a significant benefit to the cloth producer.

SUMMARY OF THE INVENTION

It is an object of the present invention, therefore, to provide a method and apparatus for creating a wide width heat transfer printing paper utilizing conventional width rotogravure process printing paper.

It is a further object of the present invention to provide a method and apparatus for splicing two parallel sheets of rotogravure printed heat transfer paper with precise registration between the patterns on the respective joined sheets.

The above and other objects are achieved by providing a machine which maintains precise alignment of the parallel sheets, which provides a small overlap between the sheets, and provides a glue application station immediately before the two sheets contact each other. The two source rolls of printed heat transfer paper are provided with separate adjustments of the position of the rolls along their axis of rotation. Edge sensors on each roll provide feedback to a controller which maintains the overlap between the sheets to a desired amount. After glue is applied to the overlap region and the edges of the two sheets are brought together, a glue splice laydown roller compresses the bonded junction between the sheets of paper. The paper is then wound on a rewind roll having the wider width. The rewind roll is provided with a foam surface around which the paper is wrapped such that the larger thickness in the vicinity of the overlap can be depressed into the roll, thereby permitting an increased amount of paper on the roll without destruction of the paper.

BRIEF DESCRIPTION OF THE DRAWINGS

FIG. 4 is a cross-sectional view of a rewind roll in accordance with the present invention;

FIG. 5 is a front view of only the drive and nip rollers in accordance with the present invention.

DETAILED DESCRIPTION OF PREFERRED EMBODIMENTS

Figure 1:
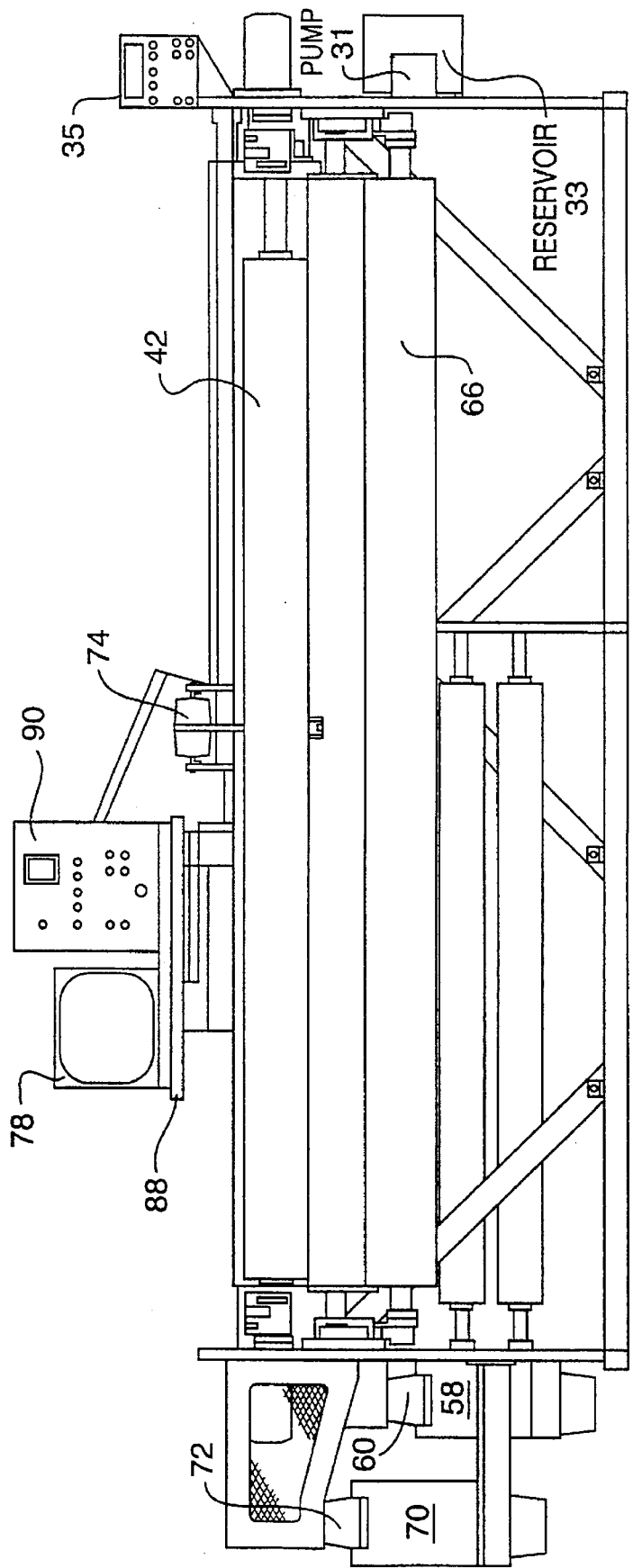
FIG. 1 is a front view of an apparatus in accordance with the present invention.
Figure 2:
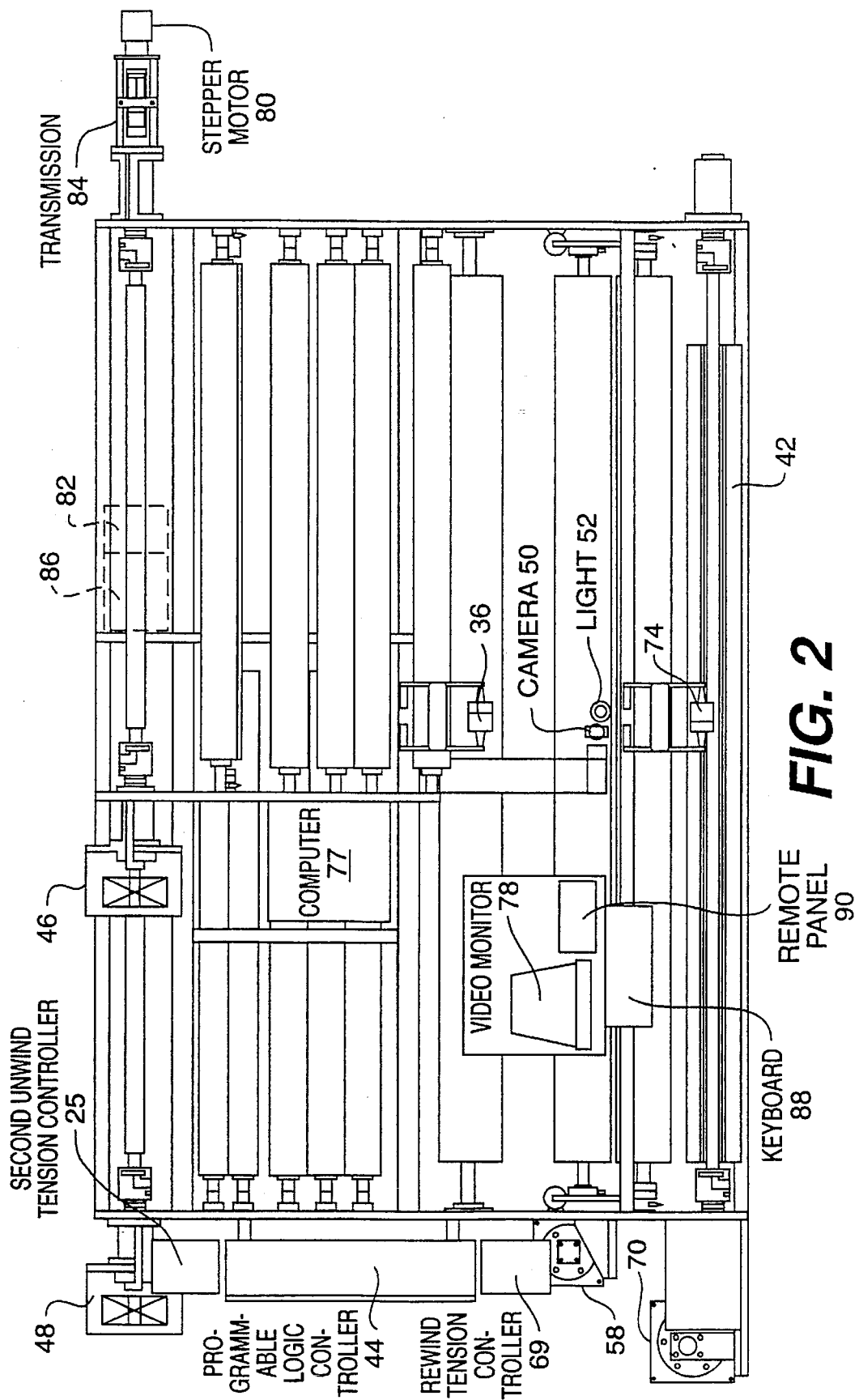
FIG. 2 is a top view of the apparatus in accordance with the present invention.
Figure 3:
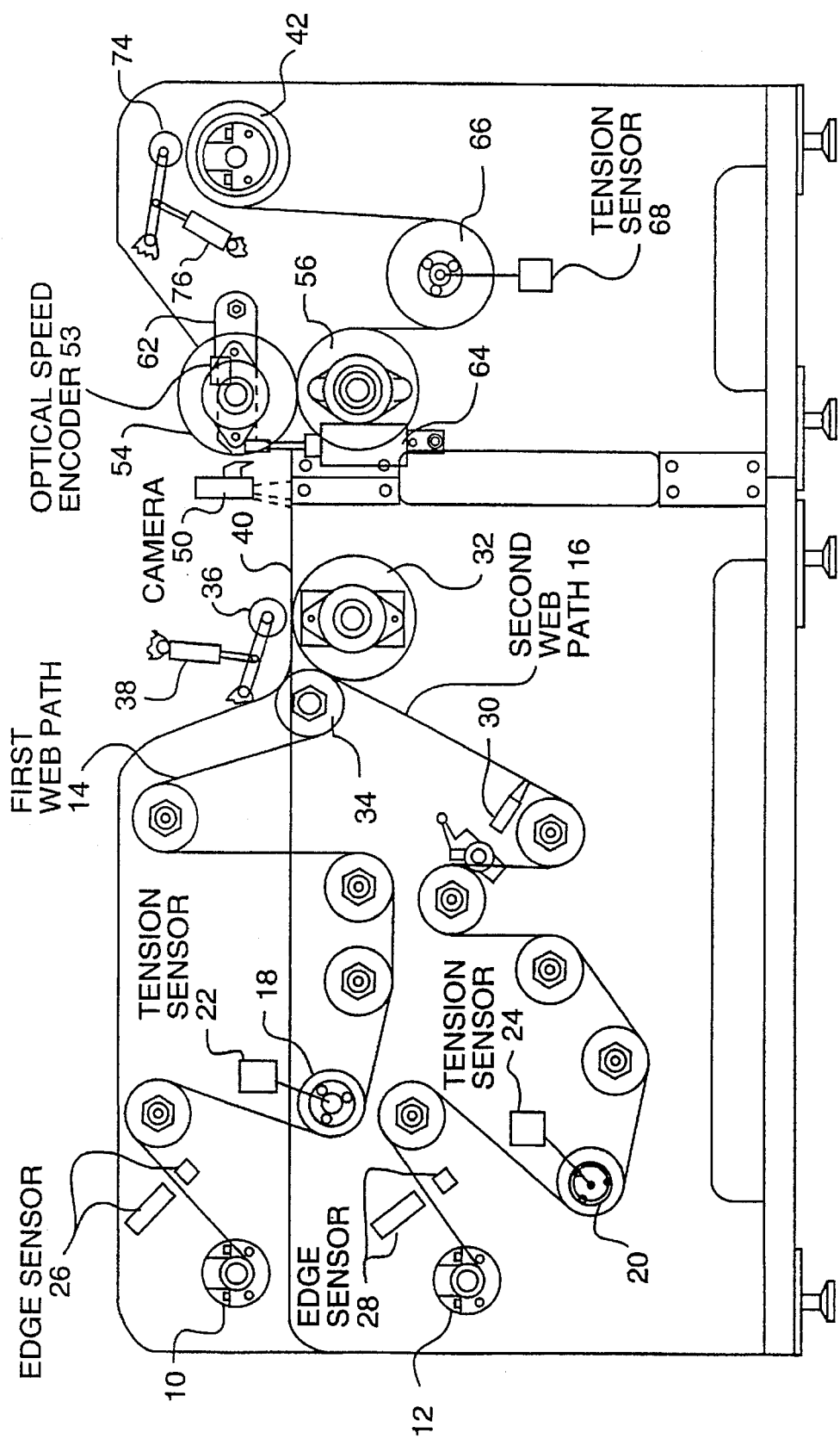
FIG. 3 is a side view of the present invention showing the paper web paths.

In the detailed description of preferred embodiments, the same numerals will be utilized to designate the same parts in the respective views. FIGS. 1, 2 and 3 are front, top and side views of the elements comprising the present invention and are discussed as follows.

Conventional width heat transfer printing paper is unwound from first source roll 10 and second source roll 12 with the heat transfer ink side down in a preferred embodiment. The paper passes along first web path 14 and second web path 16 which are defined by face and path rollers shown but not numbered in the Figures. Path rollers 18 and 20 are associated with the first and second web paths, respectively, and are mounted by way of unwind tension sensors 22 and 24 which, in a preferred embodiment, are live type (rotating), strain gauge transducers (full bridge) having a 200 pound range and being screw mounted to the frame of the apparatus (shown in FIG. 3 in generic form). The first and second tension sensors provide electrical outputs to first and second unwind tension controllers 23 and 25, respectively, indicative of the tension in the paper from each of the first and second source rolls travelling along the first and second web paths (the second unwind tension controller 25 is shown in FIG. 2 and the first unwind tension controller 23 would be located immediately thereunder).

First and second edge sensors 26 and 28 provide a signal indicative of the position of the edge of the paper travelling along the respective web paths to a programmable logic controller ("PLC") 44 which, in addition to logic control, provides on/off enabling signals to the unwind tension controllers 23 & 25, the main motor drive 59, the rewind tension controller 69 and the rewind motor drive 71. In a preferred embodiment, the edge sensors may be a fiberoptic cable with a visible light sensing module, providing an analog 0 to 10 volt DC output with an appropriate status indicator. As will be seen, the operation of the edge sensors is significant in maintaining the relative position of the two sheets of paper travelling through the first and second web paths 14 and 16, respectively.

A glue gun 30 applies glue to an edge portion of the paper from the second source roll prior to the overlap between paper from the first source roll and the second source roll which takes place between the first full width roller 32 and the last partial width roller 34 located in first web path 14. The glue gun 30 is supplied with an appropriate glue by glue pump 31 which pumps the glue from reservoir 33. Glue control panel 35 monitors and controls the pressure of the glue and its supply to the glue gun 30 and, in response to a speed signal, varies the rate of glue application in proportion to the speed of paper travel.

Although any appropriate glue could be utilized for joining the first and second source roll sheets of paper, in a preferred embodiment, the glue used was a water-based glue with thermoset particles contained therein. In one embodiment, a 1500 centipoise water-based glue with thermoset (70QMN) particles (59/41 solids/water) was used and, in another instance, 700 centipoise water-based (54/46 solids/water) glue was used successfully. It is desirable that the glue be compatible with the speed of operation such that it is relatively dry by the time the joined first and second sheets of paper, more properly referred to as single sheet 40, is wound on the rewind roll 42. Part of the drying comes from the paper's absorption of water from the glue and this is aided by the pressure of a glue splice laydown roller 36.

The splice laydown roller 36 is pivotally mounted and biased into pressure contact with the overlap area of the sheet by air pressure cylinder 38. The pressure applied by roller 36 ensures that the glued overlap or splice is sufficiently compressed to properly disperse the glue (applied by glue gun 30) throughout the necessary amount of the overlap area in order to obtain a sufficient bond between paper from the first and second source rolls.

Figure 6:
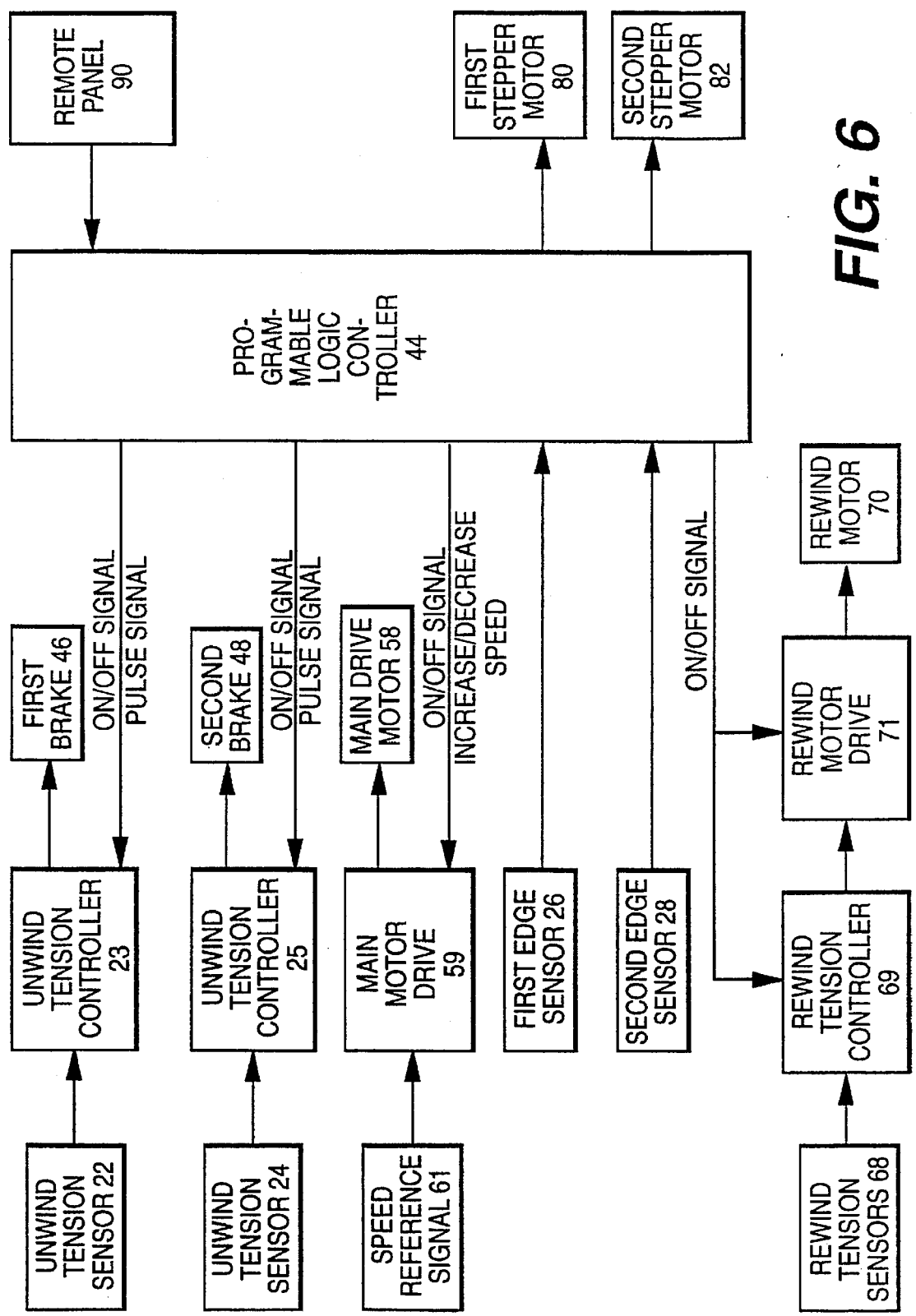
FIG. 6 is a schematic indicating the functional aspects of the programmable controller utilized in the present invention.

The tension sensors 22 and 24 provide tension indication signals to the first and second unwind tension controllers 23 and 25 as can be seen in the electrical block diagram shown in FIG. 6. Depending upon the tension sensing input, the unwind tension controllers provide an output to the first or second brakes 46 and 48, respectively. In a preferred embodiment, the unwind tension controllers are analog tension controllers which operate the dual disk (10 inch) pneumatic brakes through enclosed dual valves. Normally, a relatively low setting on the analog tension controllers serves to maintain the brakes at a relatively low friction level which is sufficient to maintain the desired tension in each of the first and second web paths 14 and 16, respectively.

With the separate sheets having been joined, the resultant single sheet 40 passes through an overlap or junction examining station comprised of digital camera 50 and halogen illumination light 52. The single sheet passes between nip and face rollers 54 and 56, respectively. The nip roller 54 includes a speed sensor which in a preferred embodiment may be an optical encoder 53 having a 1024 pulses per revolution resolution (for providing the desired speed signal to the glue controller 35).

As can be seen in FIG. 5, a main drive motor 58 (in a preferred embodiment, a 3 horsepower electric motor) controlled by main motor drive 59 (in response to a speed reference signal 61 from the output of the motor) and acting through an appropriate angle gear 60 (in a preferred embodiment, a 10-to-1 angle gear) is used to drive face roller 56. The face roller is covered with a resilient material, in a preferred embodiment, neoprene, which is more resilient than the covering of nip roller 54 which is covered with buna N material. Additionally, nip roller 54 is located on lever 62 at either end thereof and can be controllably moved into and out of contact with the face roller 56. Connected between the lever and the frame are air cylinders 64 which act on levers 62 to raise nip roller 54 out of contact with face roller 56 when initially threading paper through the system before start-up.

After start-up, air cylinders 64, through levers 62, pull the nip roller down into contact with the face roller and, since the face roller is of a more resilient material, actually deforms the face roller slightly at the point of contact. This slight deformation ensures that the face roller maintains a good "grip" on the single sheet of paper 40 being pulled through the machine. Thus, main drive motor 58 serves to pull paper from the first and second source rolls through the machine through the first and second web paths, past the gluing and joining stations, past the camera station to the exit of the nip and face rollers.

An output tension roller 66 operates, in conjunction with two 400 pound rewind tension sensors 68 and rewind tension controller 69, to control the operation of rewind motor 70 through rewind motor drive 71. The rewind motor 70, in a preferred embodiment, is a 5 horsepower electric motor, operating through angle gear 72 to drive rewind roll 42. Thus, tension between the nip and face roller exit and tension on the single sheet 40 as it exits the nip and face rollers and is wound on the rewind roll 42 is controlled by the drive of the rewind motor which, in turn, is controlled by the rewind tension controller and the input from the tension sensor 68.

Another splice laydown roller 74 is biased into contact with the single sheet 40 on top of the splice or overlap region as it is wound on rewind roll 42. It is biased into contact by air cylinder 76 and serves to bias the overlap thickness into direct contact with the underlying splice thickness.

Precise registration of the patterns between the two web paths is maintained by the junction examination station as indicated by camera 50 and light 52. The location of the heat transfer printing ink in its pattern on either the lower surface of paper 40 or upper surface of paper 40 is not significant as enough of the image can be viewed by camera 50 for registration purposes. The camera takes an enlarged image of the overlap area between the first and second web paths and provides the realtime video to computer 77 (in a preferred embodiment a 486sx 25 MHz computer with frame grabber). The video frame grabber provides a still picture of the junction on video monitor 78.

The video image on monitor 78 is periodically updated every "n" inches (where n is an integer) as selected by the operator at the computer keyboard 88. In a preferred embodiment "n" is usually set to be the pattern length. This length is then measured by the optical encoder 53 and is serially sent to the batch counter in remote panel 90. This synchronizes the image to the same spot on the pattern for each frame so that an operator looking at the image can visually inspect the registration of the junction between the pattern on the first web path and the pattern on the second web path. If the pattern appears to the operator to be drifting towards misregistration, the operator will pulse one of brakes 46 or 48 on the side which appears to be getting ahead of the other side. This pulsing of the brake is a momentary increase in the drag at the first or second source roll which tends to slow down the transport of paper on that side bringing the pattern into registration.

While the registration operation is accomplished manually in the present invention, it could easily be accomplished automatically with conventional image sensing where, if the misregistration is greater than a preset amount, the appropriate source roll is momentarily braked until the misregistration is below a preset level. Additionally, it will be known by those of ordinary skill in the art that the normal set tension on brakes 46 and 48 could be adjusted based upon misregistration corrections so that if one side is consistently going faster than the other side and thus tending to bring the junction into misregistration, the brake tension on that side could be increased (or tension on the other side decreased) until little or no correction is necessary.

The first and second edge sensors 26 and 28 are connected through programmable logic controller 44 to first and second stepper motors 80 and 82 which, in turn, operate transmissions 84 and 86 (stepper motor 82 and transmission 86 are shown in phantom lines as their view is blocked in FIG. 2 by the first source roll 10). In a preferred embodiment, the stepper motor is a slo-sync motor with a 20-1 gear ratio and the transmission is a lateral worm gear assembly such that, in combination, there are 70 steps per inch of lateral travel of the source roll. The transmission serves to move its respective source roll along its axis of rotation changing the edge position of the paper along the web path from the respective source roll.

It will be understood then that, by operation of the respective stepper motors, the edge position of paper along the first and second web paths can be maintained very precisely so as to permit, in a preferred embodiment, an approximate one-quarter inch overlap at the gluing station. Keyboard 88 permits interaction with the programmable logic controller 44 as does remote panel 90.

FIG. 4 includes a cross-sectional view of the rewind roll 42. The roll is mounted in hinged chucks 92 with a central steel shaft 94. Core mounting chucks 96 are spaced along the steel shaft 94 to support the rewind cardboard core 98 (the shaft may also have an external diameter equal to the internal diameter of the cardboard core so as to eliminate the need for core mounting chucks).

Surrounding the cardboard core 98 having, in a preferred embodiment, a 2¾ inch inner diameter with a ½ inch wall, is a resilient material, in a preferred embodiment, 2 to 2½ inches thickness of open cell polyurethane foam. The rewind tension is set such that as the output single sheet paper 40 is wound onto the rewind roll, the resilient material 100 is slightly compressed with splice laydown roller 74 depressing the spliced portion (comprising the thickness of two layers of paper and the glue therebetween) somewhat relative to the remaining paper on the roll.

As the paper thickness builds up on the roll, the extra thickness created at the splice junction serves to compress the resilient material 100 more than the single sheet layers of paper adjacent thereto. As can be seen, if there were no resilient mounting under the paper, the double layer thickness in the vicinity of the overlap would very quickly build up to a thickness twice as high as the single sheet paper thickness adjacent thereto causing very substantial distortions in the paper and even breaking the paper in some instances. The resilient roll allows a significant portion of this increase in thickness to extend down into the resilient material and towards the cardboard core alleviating the effects of the extra thickness at the overlap junction. The utilization of the resilient foam covered cardboard core permits 500 or more meters of paper to be wound on a single roll.

The operation of the splicing apparatus can be at paper speeds up to 30 meters per minute or more. The use of the rotogravure process permits the printing of heat transfer print ink on the paper at speeds up to 100 meters per minute or more. Consequently, heat transfer paper, permitting printing up to almost twice the conventional print width, can be rotogravure printed (in its single width form) with its attendant accuracy and definition and then combined (in double width form) in a fast, cost-effective manner. As a result, cloth printing customers can print extra wide cloth with the extra wide paper at normal printing speeds (up to or beyond 14 yards per minute) which is at least twice the print speed of the prior art Lemaire type machine. The accuracy of such wide cloth printing is increased since there is no requirement for the cloth printing customer to worry about registration between the rotogravure printed sheets (as they have been previously joined).

One of ordinary skill in the art will envision many different and equivalent modifications of the structures disclosed in the attached drawings. For example, the main and rewind motors are not required to be electric motors and indeed hydraulic or air powered motors could be utilized. Similarly, the cylinders driving the splice laydown rollers and the nip compression roller, while they are air pressure cylinders in a preferred embodiment, could be hydraulic, electrical, mechanical or electro-mechanical biasing devices as well. While in a preferred embodiment the tension sensors are strain gauges, any number of device (such as a spring mounting with a rotor position output, i.e., from an LVDT (linear variable differential transformer), or any such system) could be utilized to provide a tension indication signal to the programmable controller.

The edge sensor, in a preferred embodiment is a fiberoptic capable with visible light sensing modules, could be any light sensing system, or mechanical sensing system for that matter, utilized to sense the position of the edge of the paper in each of the first and second web paths. Similarly, while stepper motors and worm gear transmissions are used to adjust the position of the first and second source rolls along their axis of rotation, any electrical, mechanical or hydraulic system responsive to the edge sensors could be utilized for positioning the first and second source rolls along their axis of rotation.

While in a preferred embodiment the digital camera 50 is utilized with a computer programmed video frame grabber, in order to provide an operator with a still picture on video monitor 78 which can be visually analyzed for proper registration and the appropriate correction made in the event of misregistration, an automatic system where the camera image is electronically analyzed to determine registration between the edges of the pattern could easily be incorporated.

The gluing system utilizes the 1024 pulses per revolution from optical encoder 53 rotating in conjunction with the nip roller 54 to provide a speed signal to the glue gun controller 35 as well as to the programmable controller 44 which provides appropriate drive signals to the main motor 58. The glue gun 30, in a preferred embodiment, is a microprocessor controlled gluing system utilizing a 0.4 mm nozzle with flow controlling adjustment (manual overdrive) with 2000 cycles per second cycling a ½ inch diaphragm pump with pressure regulator to ensure proper glue flow from the reservoir 33 to the glue gun 30. Again, any of a number of glue or adhesive application systems could be utilized and different types of water-based and/or solvent-based glues would also have utility in the present system. In the event slower drying glues were used, a heat lamp or other means for increasing drying rate of glue in the region of the glued splice laydown roller 36 could be utilized.

It is noted that the conventional rotogravure printed heat transfer printing paper has a number of color registration marks along the margin thereof. These marks are used in the original rotogravure printing process to ensure that different colors are in proper registration to obtain a high quality printed image on the paper. It is envisioned that the present embodiment could utilize three infrared scanning heads for sensing color registration marks with respect to each of the two normal width sheets during their passage along the first and second web paths and any sensed misregistration, either laterally (in terms of the desired amount of overlap) or longitudinally (in the direction of paper movement), could be fed back to the appropriate stepper motor and/or pneumatic brake to maintain registration between the patterns at the overlap junction.

As noted above, while the preferred embodiment utilizes pneumatic brakes, one of ordinary skill could use hydraulic, mechanical, drum and/or disk brakes to vary the rotating friction with respect to each of the first and second source rolls. Furthermore, although in a preferred embodiment, dual edge sensors and dual stepper motor/transmissions are shown so as to position the paper in both the first and second web laterally, if the paper in one path can be maintained in a specific lateral position, only a single edge sensor and stepper motor/transmission would be needed to maintain the precise level of overlap by controlling the other web path paper.

Similarly, if one source roll had a given amount of friction, then the longitudinal registration between the patterns could be maintained by increasing or decreasing the friction on the other source roll eliminating the need for two brake controllers. Additionally, while two separate motors for the main and rewind operations are illustrated, a single motor operating the face roller 56 and rewind roll 42 through a differential transmission with a slight brake on the face roller 56 (so as to maintain a desired level of tension at the rewind roll 42) could be utilized.

Also, while the preferred embodiment utilizes rotogravure printed heat transfer printing paper having a printed width on the order of 63 inches (forming a single sheet with a width of 126 inches), smaller widths could be combined to provide a smaller than 126 inch but larger than the 63 inch output width. Obviously, the output width could be anything from the width of the input source rolls up to but not including twice the width of the input source rolls. While the preferred embodiment utilizes only two source rolls, it can be seen that three or more separate web paths could be spliced into a single output sheet having a width of even wider than 126 inches (the width of two 63 inch prints combined) if dual splicing stations were provided.

Therefore, in accordance with the above, numerous modifications and variations of the present invention will be obvious to those of ordinary skill in the art. Accordingly, the invention is limited only by the method and apparatus claims appended hereto.

What is claimed is:

1. An apparatus for splicing heat transfer printing paper unwound from first and second source rolls located upstream of a rewind roll, the paper on each of said source rolls having a width and moving along parallel paths, together into a single sheet of paper wound on said rewind roll, where said rewind roll has first and second sides and said single sheet of paper on said rewind roll has a width which is no greater than the sum of the widths of the paper on the source rolls and where paper from each source roll has heat transfer printing thereon in a pattern, and said patterns on paper from said source rolls are in registration on the single sheet of paper on said rewind roll, said apparatus comprising:

a first web path for paper moving in a downstream direction from said first source roll to said first side of said rewind roll;

a second web path for paper moving in a downstream direction from said second source roll to said second side of said rewind roll;

means for adjusting the spacing between said parallel paths such that paper from one of said first and second rolls forms at least a partial overlap with paper from the other of said first and second rolls;

means for ensuring registration, in the direction of movement along said web paths, of paper from one of said first and second rolls with paper from the other of said first and second rolls; and means for bonding paper from one of said first and second rolls to paper from the other of said first and second rolls in at least a portion of said overlap.

2. The apparatus according to claim 1, wherein said means for adjusting comprises:

means for adjusting at least one of said source rolls along an axis of rotation of said at least one of said rolls;

edge sensing means for providing an output indicative of the lateral position of an edge of paper from said at least one of said rolls; and means, responsive to said edge sensing means output, for driving said adjusting means to move said at least one of said source rolls along said axis of rotation until said lateral position of said edge of paper is in a desired position, said desired position resulting in a desired amount of overlap between paper from said first and second source rolls.

3. The apparatus according to claim 1, wherein said means for ensuring comprises:

means for examining the junction between paper at said at least a partial overlap for registration in the direction of paper movement between said patterns on said paper in the first web path and said patterns on said paper in the second web path and providing an output indication in the event of any misregistration; and means, responsive to said examining means output indication of misregistration, for at least momentarily changing speed of movement of paper from one of said first and second source rolls thereby reducing any misregistration.

4. The apparatus according to claim 1, wherein said bonding means comprises:

a means for providing an adhesive between said papers at least before said overlap at a rate which varies in proportion to the speed of the paper; and roller means for bearing on at least the overlap region between said paper from said first and second source rolls at a location downstream of the adhesive providing means.

5. The apparatus according to claim 1, further including a rewind drive motor, wherein said rewind roll is mounted on a solid shaft, said shaft mounted for rotation by said rewind drive motor, said rewind roll comprises:

an internal casing means for rotation with but not relative to said shaft, and an outer casing surrounding said internal casing, said outer casing comprised of a resilient material which is at least partially but not fully compressed by tension in said single sheet of paper being wound on said rewind roll.

6. The apparatus according to claim 1, further including a main drive motor and a pair of drive rollers located downstream of said means for bonding and upstream from said rewind roll, said pair of drive rollers comprising a first roller driven by said main drive motor and a second roller, means for mounting said second roller for movement into and out of contact with said first roller; and means for biasing said second roller into contact with said first roller.

7. The apparatus according to claim 6, wherein said first and second rollers are covered in resilient materials and the material of said first roller is more resilient than the material of said second roller.

8. The apparatus according to claim 1, further including a main drive motor and a pair of drive rollers located downstream of said means for bonding and upstream from said rewind roll, said pair of drive rollers comprising a first roller driven by said main drive motor and a second roller, further including:

first and second pneumatic brakes for controllable increasing rotating friction of said first and second source rolls, respectively;

first and second means for sensing tension in the paper in said first and second web paths, respectively; and first and second means, responsive to said sensed tension in the paper of said first and second web paths, for controlling said first and second pneumatic brakes to maintain tension in said first and second web paths, respectively, at a desired level.

9. The apparatus according to claim 8, further including:

a rewind drive motor for driving said rewind roll;

means for sensing rewind tension in the paper between said pair of rollers and said rewind roll; and means, responsive to said rewind tension, for controlling said rewind drive motor to maintain said rewind tension at a desired level.

10. An apparatus for splicing heat transfer printing paper from first and second source rolls located upstream of a rewind roll, the paper on each of said source rolls having a width and moving along parallel paths, together into a single sheet of paper wound on said rewind roll, where said rewind roll has first and second sides and said single sheet of paper on said rewind roll has a width which is no greater than the sum of the widths of the paper on the source rolls and where paper from each source roll has heat transfer printing thereon in a pattern, and said particular pattern on each source roll is in registration on the paper on said rewind roll, said apparatus comprising:

a first web path for paper moving in a downstream direction from said first source roll to said first side of said rewind roll;

a second web path for paper mowing in a downstream direction from said second source roll to said second side of said rewind roll;

means for adjusting the spacing between said parallel paths such that paper from one of said first and second rolls forms at least a partial overlap with paper from the other of said first and second rolls, said means for adjusting comprising:

means for adjusting at least one of said source rolls along an axis of rotation of said at least one of said rolls;

edge sensing means for providing an output indicative of the lateral position of an edge of paper from said at least one of said rolls; and means, responsive to said edge sensing means output, for driving said adjusting means to move said at least one of said source rolls along said axis of rotation until said lateral position of said edge of paper is in a desired position, said desired position resulting in a desired amount of overlap between paper from said first and second source rolls;

means for ensuring registration, in the direction of movement along said web paths, of paper from one of said first and second rolls with paper from the other of said first and second rolls, said means for ensuring registration comprising:

means for examining the junction between paper at said at least a partial overlap for registration in the direction of paper movement between said patterns on said paper in the first web path and said patterns on said paper in the second web path and providing an output indication in the event of any misregistration; and means, responsive to said examining means output indication of misregistration, for at least momentarily changing speed of movement of paper from one of said first and second source rolls thereby reducing any misregistration; and means for bonding paper from one of said first and second rolls to paper from the other of said first and second rolls in at least a portion of said overlap, said means for bonding comprising:
- a means for providing an adhesive between said papers at least before said overlap at a rate which varies in proportion to the speed of the paper; and
- roller means for bearing on at least the overlap region between said paper from said first and second source rolls at a location downstream of the adhesive providing means.

11. The apparatus according to claim 2, wherein said at least one of said source rolls is mounted on a shaft which is rotatable about said axis of rotation and is translatable along said axis of rotation,
- said means for adjusting comprises: a stepper motor responsive to said driving means; and a transmission for changing rotation of said stepper motor into movement of said shaft along said axis of rotation;
- said edge sensing means comprises a fiberoptic cable with a visible light sensing module for providing an output; and
- said driving means comprising a programmable process controller, responsive to said light sensing module output, for driving said stepper motor to move said at least one of said source rolls along said axis of rotation.

12. The apparatus according to claim 3, wherein
said means for examining the junction comprises: a light source for illuminating said junction; a television camera; a video frame grabber and a video monitor showing an enlarged image of said junction; and
said means for at least momentarily changing speed of movement of paper from one of said first and second source rolls, comprises at least one operator controlled pneumatic brake connected to said one of said first and second source rolls for operation in response to an operator command indicating misregistration between the patterns shown on said enlarged image of said junction.

13. The apparatus according to claim 4, wherein said adhesive providing means includes:
- a means for providing an output indicative of the speed of paper; and
- a glue gun, responsive to said speed of paper, for depositing a preset quantity of glue on at least a portion of the overlap; and said roller means comprises:
  - a roller mounted for rotation; and means for forcing said roller against said overlap at a position downstream of said glue gun.

* * * * *